United States Patent [19]

Hoeschele, Jr. et al.

[11] 3,835,385

[45] Sept. 10, 1974

[54] DIGITAL DELTA ENCODER AND DECODER

[75] Inventors: David F. Hoeschele, Jr., Norristown, Pa.; John D. Zubas, Ormand Beach, Fla.

[73] Assignee: General Electric Company, New York, N.Y.

[22] Filed: May 18, 1973

[21] Appl. No.: 361,598

[52] U.S. Cl. .............. 325/38 B, 325/141, 325/322, 329/104, 332/11 D

[51] Int. Cl. .............. H03k 13/22

[58] Field of Search..... 179/15 AP; 325/38 R, 38 B, 325/141, 321, 322; 329/104; 332/11 D; 179/15 AV

[56] References Cited

UNITED STATES PATENTS

| | | | |
|---|---|---|---|
| 3,339,142 | 8/1967 | Varsos | 325/38 B |
| 3,500,441 | 3/1970 | Brolin | 325/141 |

*Primary Examiner*—Robert L. Griffin
*Assistant Examiner*—Marc E. Bookbinder
*Attorney, Agent, or Firm*—Henry W. Kaufmann; Allen E. Amgott; Raymond H. Quist

[57] ABSTRACT

Amplitude varying signal is time sampled at constant clock rate (e.g. 40 kHz for voice) and sample is compared (in encoder) with analogue conversion of digitally stored previous value. If signal has increased, logical "1" is transmitted, if it has decreased, logical "0" is transmitted; simultaneously digitally stored value is increased for "1," decreased for "0", by increment stored in companding counter. To make increment match signal change between successive samples, companding counter content is increased by unity for three successive "1" or "0" signals, and decreased by six successive alternating "1" and "0" signals. Decoder logic is same as encoder except that no comparator is used, encoded signals operating directly upon digital stores; analogue conversion of digitally stored value is output.

5 Claims, 3 Drawing Figures

DIGITAL DELTA ENCODER AND DECODER

BACKGROUND OF THE INVENTION

1. Field of the Invention

This invention pertains to modulators for radio transmitters, and particularly to incremental or delta type modulators.

2. Description of the Prior Art

The oldest types of modulation are continuous; that is, the carrier change produced by modulation whether in amplitude, frequency, phase or the like varies continuously with the amplitude of the modulating signal. More recent than these are amplitude sampling types in which the amplitude of the modulating signal is sampled at a period small compared with the period in which the modulating signal amplitude will undergo a significant change, and the sampled amplitude is transmitted, usually, by a pulse technique such as pulse amplitude or pulse position variation, or by pulse density, or by digital encoding of the amplitude. All these methods are potentially wastefully redundant in that they occupy the spectrum and employ carrier power to report that the amplitude of the modulating signal has still the same value as at the previous sampling. To eliminate this redundancy, incremental or delta modulation produces an output in the carrier only when the modulating signal amplitude has changed by a significant quantum from its value when the preceding carrier output was produced. It is possible to operate a delta modulator with its time of operation being determined by the time at which the modulating signal changes amplitude, by quantum, from its value when the modulator last functioned to produce a carrier output. However, many modern techniques of spectrum utilization benefit from precisely predetermined times of operation, and so the use of a sampling clock is more commonly preferred.

SUMMARY OF THE INVENTION

The incoming signal is compared with an analogue conversion of the content of a digital storage register whose content represents the current latest amplitude of the signal. In other words, the signal is compared with its most recent previous value. If signal has increased since the previous sample, a logical 1 is transmitted, and at the same time the storage register is increased by the content of a companding counter. If the signal has decreased, a logical 0 is transmitted and at the same time the storage register is decreased by the content of the companding counter. The content of the companding counter is adjusted to conform to the rate of change of the incoming signal according to the following algorithm: if three successive samplings produce outputs of the same logical sense, the content of the companding counter is increased by one; if six successive samplings produce outputs alternating in logical sense, the content of the companding counter is decreased by one. The decoding or demodulating method is similar except that the modulated or encoded signal is applied directly to increase or decrease the content of the storage register, which is connected to an analogue converter whose output is the decoded or demodulated signal. In both uses the companding counter and the storage register are provided with means to prevent their overflowing in either direction.

DESCRIPTION OF THE PREFERRED EMBODIMENTS

Figure 1:
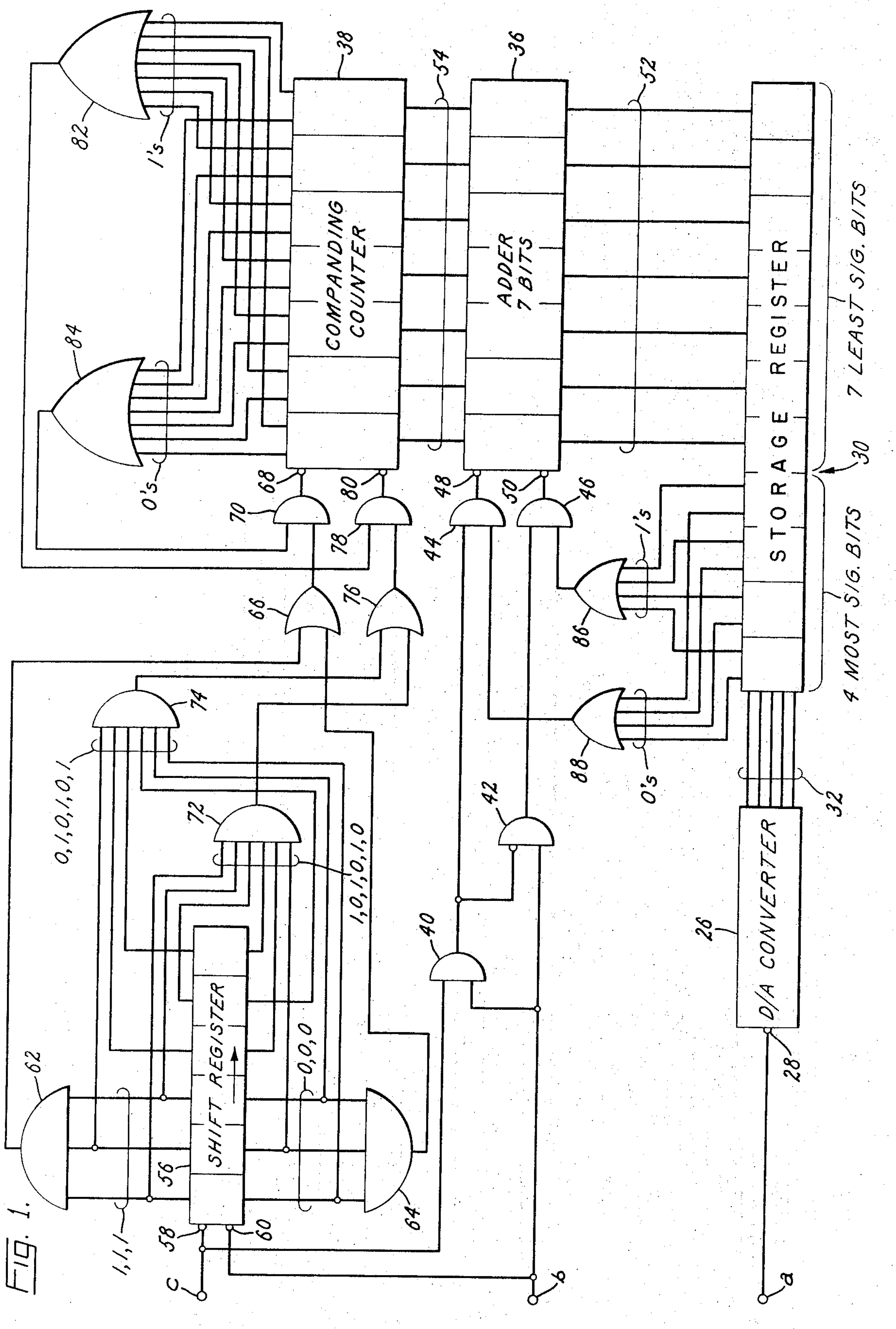
FIG. 1 represents equipment common to both the encoder and the decoder preferred embodiments.
Figure 2:
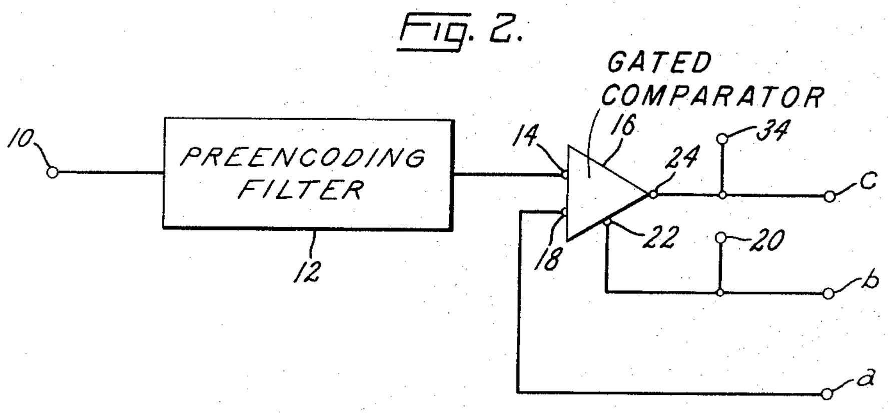
FIG. 2 represents the equipment additional to that of FIG. 1 to describe the preferred embodiment of the encoder.

FIGS. 1 and 2, with their respective lettered connection points connected together (*a* to *a*, *b* to *b*, and *c* to *c*) represent the transmitting or encoding portion of the preferred embodiment. An incoming information signal to be encoded is applied to terminal 10 by a source not represented whence it is passed through and filtered by preencoding filter 12 to adjust its spectral distribution to attenuate noise, correct frequency distortion engendered in the source, provide preemphasis or any other of the many purposes standard in the art. The filtered signal is applied to input terminal 14 of comparator 16, whose other input terminal is 18. A clock pulse is supplied at terminal 20 from a source not represented since abundant in the art, and fed inter alia to terminal 22 of comparator 16. The output appearing at terminal 24 of comparator 16 is a binary function of the relative magnitude of signals appearing at terminals 14 and 18, and has significance only during the appearance of a clock pulse. By way of convention, if the input to terminal 14 is greater than the input (the feedback) to terminal 18, a positive output, designated logically as 1, will appear at terminal 24 during the clock pulse; if the signal input to terminal 14 is less than the feedback to terminal 18, the output will be logically 0. The 0 may actually be zero, in which case certain other apparatus must be fed clock pulses from terminal 20 in order that the existence of the 0 may be known. This is done in the present embodiment. If the 0 signal is actually a negative output, it can be identified without an auxiliary clock pulse. In a simple embodiment, comparator 16 may comprise a differential amplifier with its output gated by the clock pulse at terminal 22.

Figure 3:
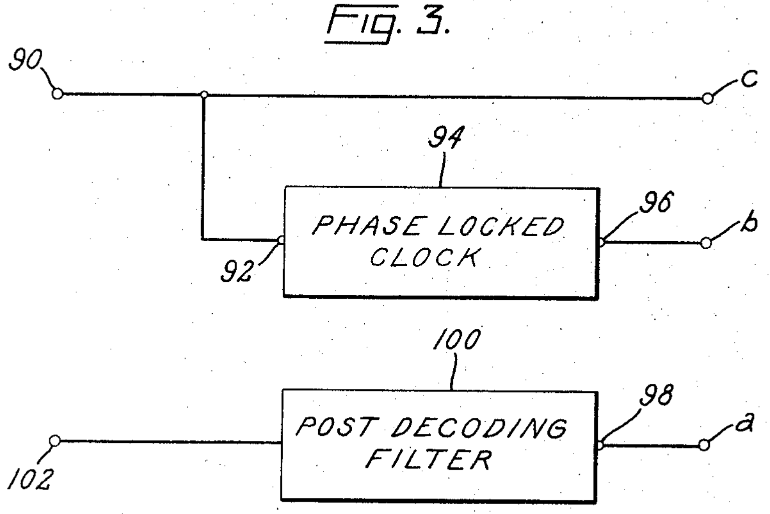
FIG. 3 represents the equipment additional to that of FIG. 1 to describe the preferred embodiment of the decoder.

The feedback to terminal 18 is supplied by a digital-to-analogue (D/A) converter 26 from terminal 28, whose output is an analogue value of the digital content of register 30, whose most significant stages are connected by channels 32 to D/A converter 26. Register 30, in normal operation, is caused to contain an approximation to the most recent value of the filtered signal at terminal 14. Thus the signal appearing at terminal 24 of comparator 16 at each clock pulse is indicative of the sign of the difference between the current value of the filtered incoming information signal and the approximation to its most recent previous value. Thus the signal at terminal 24 is in fact the delta- or incrementally modulated form of the filtered incoming information signal. As such it is fed to terminal 34, whence it may be transmitted by any known means to a receiving point provided with decoding equipment, of which an embodiment is represented by FIGS. 1 and 3 with their lettered terminals connected (*a* to *a*, *b* to *b*, *c* to *c*).

The content of register 30 is updated at the clock frequency by addition or subtraction, by means of adder 36, of the content of companding counter 38. The combination of register 30 and adder 36 is, of course, more usually described as a reversible accumulator. (The IRE Dictionary of Electronics Terms and Symbols, Institute of Radio Engineers, New York City, 1961, defines "accumulator" as a device which stores a number and which, on receipt of another number, adds it to the number already stored and stores the sum.) The present invention is more easily explained by keeping reference to register 30 and adder 36 separate. A fairly recent reference to this subject is the Digital Logic Handbook, Digital Equipment Corporation, Maynard, Massachusetts, 1966, particularly pages 20–24. Adder 36 is conveniently and preferably a parallel rather than a serial device. (As with the other single lines representing connections, the lines to adder 36 will in an actual adder comprise several conductors as the adder design dictates.) The output terminal 24 of comparator 16 is connected as one input of AND gate 40, whose other input is the clock pulse supplied from terminal 20. Thus if at the occurrence of a clock pulse there is a 1 output at terminal 24, gate 40 will produce an output. This output is connected to inhibit gate 42, whose other input is also the clock pulse, so that the existence of a 1 output from comparator 16 produces an output from gate 40 and inhibits an output from gate 42. If, however, at the occurrence of a clock pulse, there is a logical 0 at terminal 24, represented in fact by zero output voltage at terminal 24, there will be no output from gate 40; gate 42 will not be inhibited, and the clock pulse will pass through gate 42. The output of gate 40 also is applied to gate 44, which is normally open except under certain conditions to be described later; if gate 44 is open, the output of gate 40 reaches terminal 48 of adder 36 and causes it to add the content of companding counter 38. If gate 40 does not produce an output (because the output of comparator 16 is a logical 0) then gate 42 will produce an output which will normally pass through gate 46 to terminal 50 of adder 36 and cause it to subtract the content of companding counter 38 from the content of register 30. Thus if the output of comparator 16 is a 1, showing that the incoming information signal has increased above the previous approximation stored in register 30, then adder 36 adds the content of companding counter 38 to the contenter of register 30; if the output of comparator 16 is a logical 0, then adder 36 subtracts from the content of register 30 the content of companding counter 38. Thus the content of companding counter 38 is the quantum value by which the approximation stored in register 30 is changed. The operation of adder 36 does not clear the companding counter of its content, as would be done in certain arithmetic computers employing parallel adders; the content of companding counter 38 is changed only by other means adapted to cause its content to approximate as well as may be the finite difference between successively sampled (or clocked) values of the information signal. It is noted that adder 36 is connected by a plurality of channels 52 to register 30 and by a plurality of channels 54 to companding counter 38. The number of channels is shown as equal to the bit capacity of companding counter 38, it being assumed that register 30 has internal provision for transmitting carries to its more significant stages.

The content of companding counter 38 is controlled by a logic unit, which in the preferred embodiment comprises a 6-bit shift register 56 having an input terminal 58 connected to terminal 24 of comparator 16, and a clock input terminal 60 connected to terminal 20. The 1 outputs of the first three stages of register 56 are connected to AND or coincidence gate 62, and the 0 outputs of the same first three stages of register 56 are connected to AND or coincidence gate 64. The outputs of gates 62 and 64 are connected by OR or buffer gate 66 to UP terminal 68 of companding counter 38 via gate 70 which is normally open. If, and only if, three successive outputs of comparator 16 have all been 1 or have all been 0, the content of companding counter 38 will be increased by one digit. Such a consistent succession of bits indicates a consistent trend to an increased absolute difference between successive samples of the filtered signal at terminal 14, so that the quantum value of 38 should properly be changed so that each operation of adder 36 will change the content of register 30 by an increased amount. This amounts to saying that the dynamic range between successive clock or sample pulses is increased. It should be noticed that, since adder 36 can either add or subtract, it is permissible to use successive 1 and successive 0 signals in the same way to alter the content of companding counter 38; its content is an absolute value without sign.

The means for increasing the quantum increase (or decrease) in register 30 by increasing the content of companding counter 38 has been described; and this will obviously be too great if the rate of change of the filtered signal at terminal 14 decreases. The effect of too high a quantum will be that the system will "hunt." A 1 signal will make the content of register 30 too great; a resulting 0 signal will make it too low, and the cycle will be repeated. Thus a series of signals at terminal 24 of the form 1,0,1,0,1,0 will constitute definite indication of a strong probability that companding counter 38 is providing too great a quantum. To provide for this eventuality, alternate 1 and 0 outputs from successive stages of shift register 56 are connected as inputs to AND or coincidence gate 72, and the complementary outputs from the same stages — alternate 0 and 1 outputs are similarly connected to AND gate 74. The outputs of gates 72 and 74 are connected as inputs to OR or buffer 76, whose output is connected via normally open gate 78 to terminal 80 of companding counter 38, which is the DOWN terminal; each pulse applied to terminal 80 will decrease the content of companding counter 38 by one digit. Since signals cannot pass gate 62 or 64 and gate 72 or 74 simultaneously, there is no danger that signals will appear simultaneously at terminals 68 and 80 and 38; it will never be ordered to increase and decrease simultaneously. For convenient reference, shift register 66, gates 62, 64, 72, and 74 and buffers 66 and 76 may be considered as substantially comprising the logic unit, although necessary auxiliaries will be understood to be intended also.

One additional consideration requires specification. Companding counter 38 and register 30 must not be permitted to overflow in either direction — that is, to pass increasingly through their maximum content to zero, or to pass decreasingly through their zero content to their maximum content. This is done for companding counter 38 by buffing together by OR gate 82 all the 1 outputs of the counter stages and using the buffed output to gate via gate 78 the DOWN input, so that no down count can occur unless there is at least one 1 stored in the counter 38. Similarly, all the 0 outputs of the counter stages are buffed together by OR gate 84, and the buffed output is applied to gate 70 to gate the UP input, so that no up count can occur unless there is at least one 0 in the counter. This simple procedure is effective in the companding counter 38 because it can be stepped only one digit at a time, and hence a single 0 or 1, as the case may be, will show room for one more digit without overflow. But register 30 ordinarily receives, positively or negatively, the entire content of companding counter 38 via adder 36; and it may have some 1 and some 0 content and yet be in a condition where addition would cause it to overflow. It is possible, using known art, to provide various comparison devices to determine absolutely whether an operation of adder 36 would cause overflow; for example, a duplication of register 30 might be included to receive the output of adder 36, and transfer the auxiliary register's resulting content to register 30 only if there had been no overflow. Practical considerations offer a simpler solution. The maximum content of companding counter 38 will reasonably be made appreciably smaller than that of register 30; there would be no point to having companding counter 38 capable of changing the content of register 30 from zero to its maximum in one clock pulse. In the embodiment described, companding counter 38 has seven binary stages (giving a range of increments of about 40 db) and register 30 has eleven binary stages. The 1 outputs of the four most significant stages of register 30 are buffed together by OR gate 86 to gate at gate 46 the subtraction command to terminal 50 of adder 36, and the 0 outputs of the same stages are buffed together by OR gate 88 to gate at gate 44 the addition command to terminal 48 of adder 36. No overflow can occur. However, this will also inhibit additions or subtractions of increments from companding counter 38 which are so small that their addition or subtraction would not cause overflow — that is, so small that they would produce no positive or negative carry to the array of the four most significant digits (MSD's) of register 30. This does not effectively impair the accuracy of the operation of register 30, but rather slightly restricts its effective range. If the four MSD's of register 30 are all 0, addition to the seven least significant digits (LSD's) will be permitted, but not subtraction from them. This process must ultimately force a 1 into one of the four MSD's, and permit addition to or subtraction from the remaining seven LSD's. Similarly, if all four MSD's contain 1, subtraction from the seven LSD's will be permitted, but not addition to them, and ultimately a 0 will appear in at least one of the four MSD's. Thus approach to overflow in either direction will stop further motion of the content of register 30 to overflow at a value slightly before the theoretical limit. However, since the four MSD's give a least count of 1/32, or a discrimination of about 3 percent of maximum, this restriction of range is not serious, particularly since the discrimination may be halved by each additional stage of register 30, which will in practice be an inexpensive integrated circuit unit in which additional stages will be of trivial cost.

Along similar lines, the D/A converter 26 need not be connected to more of the MSD's than is necessary to provide the desired accuracy of conversion. Since eleven binary stages correspond to a registration of 2047, or a potential discrimination between available steps of amplitude of about 0.05 percent, it is improbable that one would connect the last few least significant stages to the D/A converter 26, in most practical cases. Five channels 32 are shown by way of exemplifying that all of the most significant stages of register 30 which are in excess of the number of stages of companding counter 38 and some, but not all, of the less significant stages may be so connected. If it is desired to secure accurate inclusion of comparatively low amplitudes represented by the less significant stages, they may, of course, be connected to D/A converter 26.

FIGS. 1 and 3, with their respective lettered connection points connected together (*a* to *a*, *b* to *b*, and *c* to *c*) represent a decoder for signals encoded by the embodiment represented by FIGS. 1 and 2, connected together at their respective lettered connection points as described. Since it is generally true that, to decode encoded matter, it is necessary to apply the algorithms used in encoding, the decoder strongly resembles the encoder. This resemblance is heightened by the generally closed-loop organization of the encoder which includes the production by D/A converter 26 of an analogue representation of the encoded signal as represented by the content of register 30. The consequent identity in both the encoder and the decoder of the apparatus represented by FIG. 1, with lettered connection points *a*, *b*, and *c* to show how it may be connected to the identically lettered connection points, either of the encoding components represented in FIG. 2, or of the decoding components represented in FIG. 3, permits economy of description.

In FIG. 3, terminal 90 is connected by means not shown to receive the signals provided at terminal 34 of the encoder represented in FIGS. 1 and 2. These means will be wire or radiative channels in conventional applications, but could be e.g. mechanical pulses in some extraordinary application provided the mechanical pulses were converted into electrical for application to terminal 90. The signals at terminal 90 are connected via point c to terminal 58 of shift register 56 and to gate 40. Terminal 90 is also connected to terminal 92 of a phaselocked clock 94 whose output terminal 96 is connected to the clock pulse line of FIG. 1 via point b. Phase locked clock 94 is designed to operate at the same frequency as the clock source connected to terminal 20 in the encoder embodiment of FIGS. 1 and 2. It is phase locked with the incoming signals received at terminal 90 from terminal 34 to insure its synchronism not only in frequency but in phase with the clock signals in the encoder. Since signals from terminal 34, and consequently at terminal 90, may be logical 1 or 0, and since a logical 0 may be an actual zero amplitude — an omitted pulse — the phase locked clock must have sufficient stability to remain adequately in phase when 0 signals occur. This is well within the skill of the known art. An alternative is to transmit a clock pulse separately from the transmitting station associated with the encoder; this will be particularly applicable if the transmitting station provides a number of encoded channels all of which can rely upon the transmission of a single standard of clock pulse frequency and phase. If it be assumed momentarily that the content of the various bit stores in the decoder is identical with that of the identical bit stores in the encoder when operation is begun, it is evident that register 30 will contain a digital representation of the amplitude of the encoded signal, and the D/A converter 26 in the decoder will provide at its terminal 28 an analogue equivalent of the digital representation. In FIGS. 1 and 3, terminal 28 is represented connected to input terminal 98 of a postdecoding filter 100, at whose output terminal 102 the decoded representation of the signal originally incoming at terminal 10 of FIG. 2 will be available.

Postdecoding filter 100 is provided to alter the frequency spectrum of the decoded signal from D/A converter 26 in the inverse of any distorting characteristic of preencoding filter 12 — that is, for example, to restore any preemphasized or deemphasized information frequencies to their proper amplitudes. It is not necessarily completely the inverse in its transmission characteristics of preencoding filter 12; if, for example, filter 12 is designed to attenuate a particular frequency band in the incoming information signal at terminal 10 because that band has an excessively high noise content and negligible information content, one would not design postdecoding filter 100 so it would restore the noisy band to its original amplitude. The use of both of these filters 12 and 100 is a matter of design choice; they are shown for completeness of the preferred embodiment, not because they are essential to the invention.

A final consideration of theory remains which has two aspects. Noise or interference pulses may put the registers of the decoder out of agreement with the identical registers in the decoder; or at the beginning of operation they may not initially be in aggreement. Since delta or incremental modulation involves what is essentially integration at the decoding apparatus, disagreement between the content of the two registers 30 of the encoder and the decoder will amount to a difference in the constant of integration which will not change the shape of the reproduced wave. Ordinarily the wave shape is what conveys the information in the signal; even in television, the "black" level is transmitted only relative to other signal components, and is given an absolute value by the d-c restorer at the receiver. So if the registers 30 at both ends of the channel are not in agreement, they will change relatively to their previous content until one of them is in danger of overflow. The register 30 in danger of overflow will then "mark time" or "slip" until it is ordered by its controls to back away from the bound it has reached. But the clock frequency employed to sample the incoming signal in the encoder and to adjust the output amplitude in the decoder is considerably higher than the maximum information signal frequency component to be reproduced. In the preferred embodiment, for voice communication, it is selected at 40 kHz. Thus the recovery from the "mark time" condition will normally be rapid, and has a high probability of producing an error in the reproduced signal at the decoder output which will lie largely outside of the information signal band.

The question of disagreements between the two companding counters is similarly self-solving. Whenever the incoming information signal applied to terminal 10 of the encoder reaches an amplitude value at which its rate of change is nearly zero, the required increment provided by companding counter 38 in the encoder will be nearly zero, so its count will be rapidly reduced by pulses applied to its terminal 80. The identical logic in the deocder will cause its companding counter 38 also to be stepped down. Since in usual information signals, as for example in voice communication, there are frequent pauses as between syllables, this phenomenon produces adequate correspondence between the two companding counters 38 in the encoder and the decoder.

Commercially available integrated circuit units provide shift registers, counters, adders, buffers or OR gates, and gates also known as AND gates or coincidence gates, and the various other components required for the embodiment of our invention. For reasons originating in the operating characteristics of the semiconductor devices employed in such integrated circuits, such devices commonly have complemented outputs. The manner of employing such devices to perform the logical operations which have here been described generally in a noncomplemented or positive fashion is part of the well known art; one published reference on the subject is the Catalogue of Integrated Circuits of the Texas Instrument Company. For the purpose of description of the manner of operation of our invention, we have preferred the simpler positive or largely noncomplemented description, which is fully operative, and much more readily comprehended.

It is also part of the known art that the application of clock pulses to certain components may have to be delayed, particularly in high speed operation, to permit other components to change their state or condition. Since the delay required in any given case will be a function of the speed of operation of the components employed, it is not possible to specify these delays, the provision of which is part of the known art.

Since the attached claims necessarily employ somewhat general terminology in certain of their recitals, antecedent for these recitals is here provided. The encoding apparatus may be described as delta or incrementally encoding. Shift register 56, with gates 62, 64, 72, and 74 comprise pulse sequence means. Buffers 82 and 84 and gates 70 and 78 are companding counter overflow prevention means. Buffers 86 and 88, and gates 44 and 46 comprise register overflow prevention means. Phase locked clock 94 comprises clock pulse means in the decoder. Other recitals are believed to find adequate antecedent in the specification proper.

What is claimed is:

1. Delta or incremental encoding apparatus comprising:

a. a source of an incoming amplitude-varying first signal;

b. clock pulse source means;

c. clocked comparator means connected to receive the incoming amplitude-varying first signal, to receive a comparison second signal representative of the amplitude of the incoming signal at the time of the occurrence of the last preceding clock pulse, to receive clock pulses from the clock pulse source means and to produce a comparator output signal having a first parameter having significance of logical 1 when the amplitude of the said first signal is greater than that of the second signal and having a second parameter having significance of logical 0 when the amplitude of the said first signal is less than that of the second signal;

d. pulse sequence means connected to receive the comparator output signals and, responsively thereto, to produce a third signal responsively to a sequence of a predetermined number of comparator output signals of like significance and to produce a fourth signal responsively to a sequence of a predetermined number of comparator output signals of alternately unlike significance;

e. companding counter means connected to receive the said third signal and responsively thereto to increase its count and to receive the said fourth signal and responsively thereto to decrease its count;

f. companding counter overflow prevention means connected to inhibit the effect of the said third signal when the companding counter means contains its maximum count and to inhibit the effect of the said fourth signal when the companding counter means contains its minimum count;

g. register means h. adder means connected to receive the comparator output signals and, responsively to the first parameter thereof to add, and responsively to the second parameter thereof to subtract, the content of the companding counter means to and from the content of register means;

i. register overflow prevention means connected to inhibit the operation of the adder means responsively to the first parameter of the comparator output signal when the content of the register means is less than the maximum content of the register means by less than the maximum count of the companding counter means and to inhibit the operation of the adder means responsively to the second parameter of the comparator output signal when the content of the register means is greater than zero by less than the maximum count of the companding counter means;

j. digital to analogue converter means connected to the register means to produce an analogue signal representative of its contents as the said comparison second signal and apply the same to the clocked comparator means;

k. encoder output terminal means connected to the comparator means to receive the said comparator output signals.

2. The apparatus claimed in claim 1 in which the parameters of the therein said comparator output signal are amplitudes in two different mutually exclusive classes.

3. Apparatus for decoding delta or incrementally encoded signals which are a succession of pulses of constant average frequency having parameters signifying two different classes, first signals in the first such class having significance of logical 1 and second signals in the second such class having significance of logical 0, comprising:

a. signal input terminal means for receiving the said encoded signals;

b. pulse sequence means connected to receive the said encoded signals from the signal input terminal means and to produce a third signal responsively to a sequence of a predetermined number of encoded signals of like logical significance and to produce a fourth signal responsively to a sequence of a predetermined number of encoded signals of alternately unlike logical significance;

c. companding counter means connected to receive the said third signal and responsively thereto to increase its count and to receive the said fourth signal and responsively thereto to decrease its count;

d. companding counter overflow prevention means connected to inhibit the effect of the said third signal when the companding counter means contains its maximum count and to inhibit the effect of the said fourth signal when the companding counter means contains its minimum count;

e. register means f. adder means connected to receive the encoded signals and, responsively to first signals to add, and responsively to second signals to subtract, the content of the companding counter means to and from the content of register means g. register overflow prevention means connected to inhibit the operation of the adder means to add to the content of the register means when the content of the register means is less than the maximum content of the register means by less than the maximum count of the companding counter means and to inhibit the operation of the adder means to subtract from the content of the register means when the content of the register means is greater than zero by less than the maximum count of the companding counter means;

h. digital to analogue converter means connected to the register means to produce an analogue signal whose amplitude is representative of the magnitude of the content of the register means;

i. output terminal means connected to receive the analogue signal produced by the digital to analogue converter means.

4. The decoding apparatus claimed in claim 3 further comprising:

j. clock pulse means to produce clock pulses at the same frequency as the encoded signals, connected to receive the encoded signals and responsively thereto to maintain the said clock pulses in synchronism with the encoded signals, connected to the therein said pulse sequence means, the said companding counter means, and the said adder means.

5. The decoding apparatus claimed in claim 3 in which the significant parameters of the pulses constituting the encoded signals are their amplitudes.

* * * * *

PO-1050 (5/69)

UNITED STATES PATENT OFFICE
CERTIFICATE OF CORRECTION

Patent No. 3,835,385 Dated September 10, 1974

Inventor(s) David F. Hoeschele, Jr. & John D. Zubas

It is certified that error appears in the above-identified patent and that said Letters Patent are hereby corrected as shown below:

In the claims, claim 2 should appear as follows:

2. The apparatus claimed in claim 1 in which the parameters of the therein said comparator output signal are amplitudes.

Signed and sealed this 5th day of November 1974.

(SEAL)
Attest:

McCOY M. GIBSON JR.
Attesting Officer

C. MARSHALL DANN
Commissioner of Patents